(12) United States Patent
Stewart (10) Patent No.: US 7,528,725 B2
(45) Date of Patent: May 5, 2009

(54) PASSIVE DYNAMIC ANTENNA TUNING CIRCUIT FOR A RADIO FREQUENCY IDENTIFICATION READER

(75) Inventor: Robert Stewart, Boulder, CO (US)

(73) Assignee: Allflex U.S.A., Inc., Dallas, TX (US)

( * ) Notice: Subject to any disclaimer, the term of this patent is extended or adjusted under 35 U.S.C. 154(b) by 489 days.

(21) Appl. No.: 11/479,816

(22) Filed: Jun. 29, 2006

(65) Prior Publication Data

US 2007/0013483 A1   Jan. 18, 2007

Related U.S. Application Data

(60) Provisional application No. 60/699,806, filed on Jul. 15, 2005.

(51) Int. Cl.
*G08B 13/14* (2006.01)
(52) U.S. Cl. ............... 340/572.5; 340/505; 340/572.1; 340/572.7; 340/572.8; 340/10.1; 340/539.1
(58) Field of Classification Search ............ 340/505, 340/572.1, 572.5, 572.7, 572.8, 10.1, 539.1, 340/539.11; 343/815, 834; 342/42, 51
See application file for complete search history.

(56) References Cited

U.S. PATENT DOCUMENTS

| | | | |
|---|---|---|---|
| 3,299,424 A | 1/1967 | Vinding | |
| 3,713,146 A | 1/1973 | Carroll et al. | |
| 4,551,712 A | 11/1985 | Fockens | |
| 5,053,774 A | 10/1991 | Schuermann et al. | |
| 5,168,282 A | 12/1992 | Viereck | |
| 5,289,199 A | 2/1994 | Viereck | |
| 7,323,977 B2 * | 1/2008 | Kodukula et al. | 340/505 |
| 7,353,997 B2 * | 4/2008 | Tikhov et al. | 235/462.01 |
| 2007/0046369 A1 * | 3/2007 | Schober et al. | 330/7 |
| 2007/0057797 A1 * | 3/2007 | Waldner et al. | 340/572.7 |
| 2008/0012712 A1 * | 1/2008 | Shimizu | 340/572.5 |
| 2008/0150689 A1 * | 6/2008 | Chiu et al. | 340/10.1 |
| 2008/0280581 A1 * | 11/2008 | Rofougaran et al. | 455/296 |

* cited by examiner

*Primary Examiner*—Daryl C Pope
(74) *Attorney, Agent, or Firm*—Blakely, Sokoloff, Taylor & Zafman LLP (57) ABSTRACT

A resonant antenna circuit for a radio frequency identification (RFID) reader generates an electrical signal for activating a passive identification tag. The identification tag in turn generates a coded electrical signal that is detected by the reader. The electrical characteristics of the resonant circuit are dynamically altered so that the antenna performs more optimally as a transmitter and receiver for different types of transponders. The resonant circuit uses only passive components and the instantaneous resonant frequency tuning point is determined by the state of the activation signal transmitter.

17 Claims, 7 Drawing Sheets

Fig. 2A  Equivalent Circuit During Activation Signal ON Interval $F_R = 1/[2\pi \sqrt{LC}]$ Fig. 2B  Equivalent Circuit During Activation Signal OFF Interval $F_R = 1/[2\pi \sqrt{LC}]$

Fig. 5A  Equivalent Circuit During Activation Signal ON Interval $F_R = 1/[2\pi \sqrt{LC}]$ Fig. 5B  Equivalent Circuit During Activation Signal OFF Interval $F_R = 1/[2\pi \sqrt{(L + L_T) C}]$

PASSIVE DYNAMIC ANTENNA TUNING CIRCUIT FOR A RADIO FREQUENCY IDENTIFICATION READER

RELATED APPLICATION

This application claims priority of provisional application 60/699,806 filed Jul. 15, 2005.

FIELD OF THE INVENTION

This invention relates to radio frequency identification (RFID) systems and, more particularly, to an RFID reader with a passive dynamic antenna tuning circuit.

BACKGROUND OF THE INVENTION

International Standards Organization (ISO) Standard 11785, "Radio frequency identification of animals—Technical Concept" (1996) relates to radio frequency identification (RFID) systems that comprise low frequency reader devices and passive, inductively powered identification transponders or tags ("ID tags"). ISO Standard 11785, the disclosure of which is incorporated herein by reference, defines the technical principles for communications between reader devices and two types of electronic passive identification transponders referred to as "HDX" and "FDX-B". These transponders contain identification information stored in binary form, which is conveyed to the reader when the transponder is suitably activated by the reader. In RFID systems of this type, the reader device generates a tag activation signal and receives identification data signals from the ID tag using a resonant frequency antenna circuit. The reader device can use a single antenna coil to perform these functions or can use separate transmit and receive antenna elements. Readers in which a single antenna performs both transmit and receive functions are very economical and efficient, and comprise the most common design implementation of low-frequency RFID readers. However, when a single antenna is designed to serve these multiple purposes, the antenna's design characteristics are inevitably compromised, and the antenna performs less efficiently than when it can be designed optimally for a single purpose.

Passive low frequency RFID readers and tags are based on operating principles that are well-known to those of ordinary skill in the art. These operating principles are described in, for example, U.S. Pat. No. 3,299,424 (Vinding—1967), U.S. Pat. No. 3,713,146 (Cardullo—1973), and U.S. Pat. No. 5,053,774 (Schuermann—1991), and in textbooks such as "RFID Handbook" (Finkenzeller—1999).

Because the RFID reader's activation signal is a single frequency and because the identification tag signal comprises multiple frequencies, it is advantageous to adjust the resonant frequency tuning of the reader's antenna circuit at the appropriate times so that the antenna is always optimized for either transmitting the activation signal frequency or for receiving the transponder identification signal frequencies.

U.S. Pat. Nos. 5,168,282 and 5,289,199 (Viereck—1992 and 1994) disclose a parallel-coupled antenna resonant circuit that dynamically switches between two resonant frequencies as a function of the voltage in the circuit. An antenna coil is coupled in parallel to a resistor and a first capacitor. A second parallel capacitor is switched in and out of the circuit to yield a higher resonant frequency when receiving and a lower resonant frequency when transmitting.

SUMMARY OF THE INVENTION

The present invention provides an efficient, economical, and reliable resonant antenna circuit for a radio frequency identification (RFID) reader in which an electrical signal is generated for activating a passive identification tag and in which the identification tag in turn generates a coded electrical signal that is detected by the reader.

The electrical characteristics of the resonant frequency antenna circuit are dynamically altered so that the antenna performs more optimally as a transmitter and receiver for both HDX and FDX-B type transponders. Various circuit embodiments using only passive components are disclosed herein. In each case, the instantaneous resonant frequency tuning point is determined by the state of the activation signal transmitter.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Figure 1A:
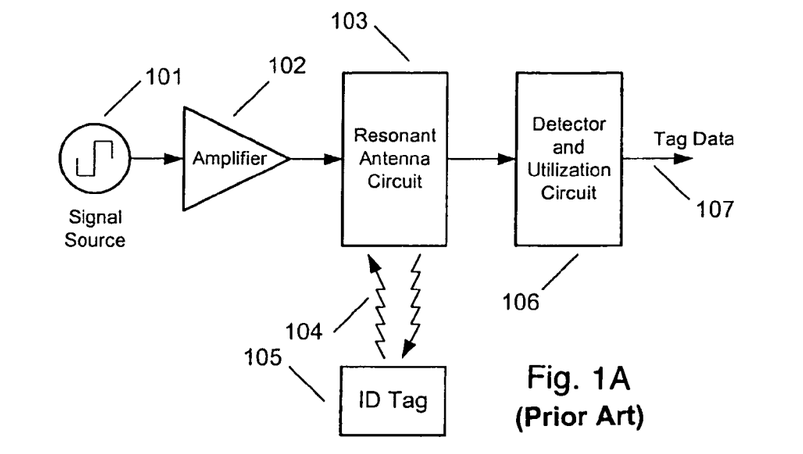
FIG. 1A illustrates the basic components of a prior art passive RFID system.

FIG. 1A depicts a prior art RFID reader, which generates an activation signal (usually a single frequency unmodulated signal) using a signal source [101] and an amplifier [102] to drive a resonant antenna circuit [103]. This activation signal is manifested as a time-varying electromagnetic field, which couples with the ID tag [105] by means of the electromagnetic field's magnetic field component [104]. The ID tag [105] converts this magnetic field into an electrical voltage and current, and uses this electrical power to activate its internal electronic circuitry. Using any of several possible modulation schemes, the ID tag conveys binary encoded information stored within it back to the reader via magnetic field [104], where the detector and utilization circuit [106] converts this binary code into an alphanumeric format tag data [107] in accordance with the particular application.

Figure 1B:
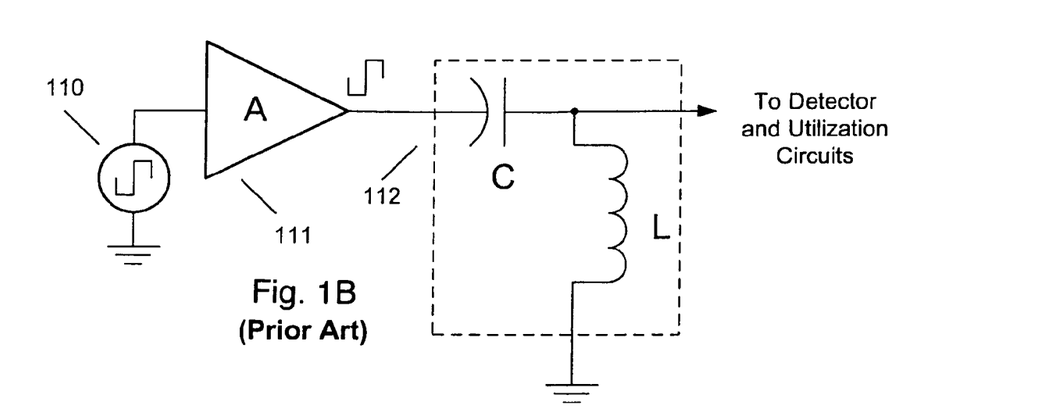
FIG. 1B illustrates the activation signal generation and resonant antenna circuit for a prior art single antenna coil reader using a single-ended drive circuit.
Figure 1C:
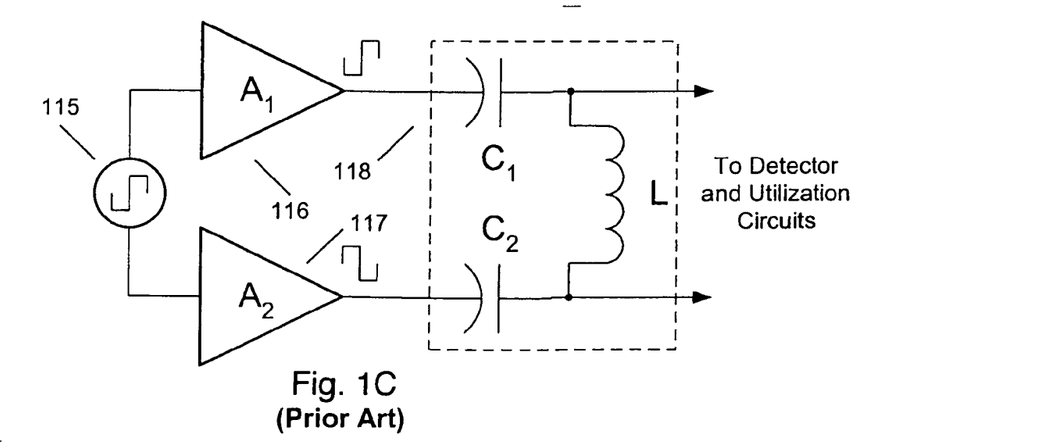
FIG. 1C illustrates the activation signal generation and resonant antenna circuit for a prior art single antenna coil reader using a balanced differential implementation of the circuit shown in FIG. 1B.

Referring to the prior art designs shown in FIGS. 1B and 1C, the resonant frequency antenna circuit [112], [118] is shared by both activation signal (transmitting) and receiving circuitry. Many techniques are known for generating the activation signal, and all have in common a signal source [110], [115], an amplification means [111], [116]/[117], and a resonant antenna circuit [112], [118]. For example, U.S. Pat. No. 4,551,712 (Fockens—1985) discloses activation signal generation techniques in which the resonant antenna circuit is driven by a single-ended amplifier arrangement (i.e., FIG. 1B), and an alternate configuration comprising a differentially driven, balanced amplifier arrangement (FIG. 1C), which produces a four-fold increase in power output.

ISO Standard 11785 defines two types of transponder technologies, which are designated "full-duplex" ("FDX-B") and "half-duplex" ("HDX"). In each case, as more fully described below, an activation signal is sent to the transponder from the reader and identification code information is transferred to the reader from the transponder through the mutual coupling of an electromagnetic field.

The FDX-B transponder amplitude modulates the reader's activation signal with its binary identification code sequence. The reader detects this modulation and derives from it the FDX-B transponder's identification code. The term "full-duplex" indicates that the FDX-B transponder sends its identification code information during the time when it is receiving the activation signal from the reader.

In contrast, the HDX transponder uses the reader's activation signal to charge an internal capacitor (which functions as a very small rechargeable battery), and it uses this stored energy to self-activate a transmitter, which emits a frequency shift keyed ("FSK") signal representative of the transponder's identification code. The reader detects this FSK signal and derives from it the HDX transponder's identification code. The term "half-duplex" indicates that the reader and the HDX transponder exchange the activation signal and the identification code signal in alternating time intervals.

An ISO compliant reader must have the capability to activate and detect both FDX-B and HDX type transponders. To accomplish this, the ISO compliant reader transmits an activation signal, consisting of a 134.2 kilohertz (kHz) sinusoid, which is switched ON and OFF in a prescribed pattern in accordance with ISO 11785. During the interval in which the 134.2 kHz signal is ON, the FDX-B transponder is activated and it transmits its identification code signal cyclically for as long as the activation signal is present. During this ON interval also, an HDX transponder charges it internal capacitor. Subsequently, during the interval in which the 134.2 kHz activation signal is OFF, the FDX-B transponder is dormant, and the HDX transponder transmits its identification code sequence a single time.

The FDX-B transponder communicates to the reader by amplitude modulating the activation signal it receives. Amplitude modulation imposes variations on the activation signal's magnitude, and the reader is equipped with sensing circuitry capable of detecting these magnitude variations. This reflected signaling is somewhat analogous to shining a light beam on a distant mirrored surface and inducing a motion to the mirrored surface, which varies the amount of light that is reflected back to the light source.

An HDX transponder, by contrast, contains its own micro-transmitting capability, which is powered with energy received and stored from the reader's activation signal. Once the activation signal ceases, the HDX transponder emits a very small strength internally generated radio signal, comprising a frequency shift keyed ("FSK") modulation scheme. Specifically, the binary identification code information contained in the HDX tag is serially output such that the occurrence of a binary "1" results in the HDX tag's radio signal being 124.2 kHz and a binary "0" results in the tag's radio signal being 134.2 kHz. Thus, a corresponding analogy for HDX might comprise a light source that briefly illuminates two luminescent reflectors, one being red and the second being blue. When the light source extinguishes, the two reflectors alternately produce red and blue reflected light in accordance with some prescribed sequence.

Figure 3A:
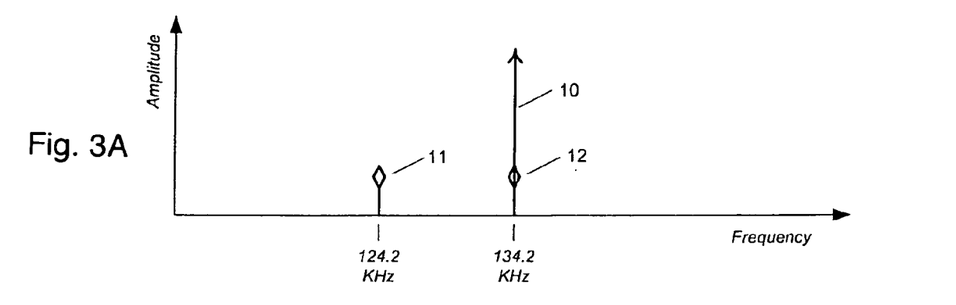
FIG. 3A illustrates the frequency spectrum of the reader's activation signal and the transponder signal frequencies for HDX.

FIGS. 3A through 3D illustrate the frequency spectral characteristics of the RFID system pertaining to ISO 11785 and to the present invention. FIG. 3A shows the spectra for the HDX case, where the activation signal [10] appears at 134.2 kHz, and where the HDX transponder frequencies appear at 124.2 kHz [11] and 134.2 kHz [12]. Since the activation signal and the HDX transponder signals alternate in time, the 134.2 kHz activation signal [10] and the 134.2 kHz transponder signal [12] never occur simultaneously. Thus, the reader's receive circuitry is able to detect the transponder frequency without being overwhelmed with its own activation signal.

Figure 3B:
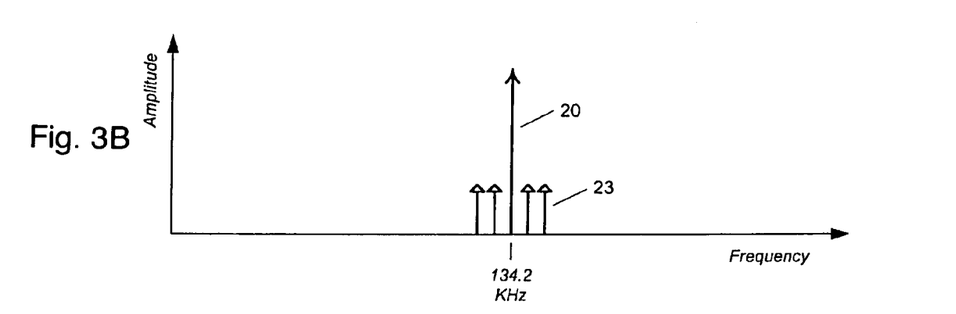
FIG. 3B illustrates the frequency spectrum of the reader's activation signal and the transponder signal frequencies for FDX-B.

FIG. 3B shows the spectra for the FDX-B case, where the activation signal [20] appears at 134.2 kHz, and where the FDX-B transponder's amplitude modulation appears as sidebands close to the 134.2 kHz [23]. As is well known to those of ordinary skill in the art, amplitude modulation sidebands appear symmetrically around the modulated carrier signal, and for FDX-B specifically, these sidebands appear at ±2.097 kHz and ±4.194 kHz. Because the activation signal and the data signal are distinct frequencies, they can occur simultaneously, and the reader is able to separate the two signals, and recover the data contained in these sideband frequencies.

Figure 3C:
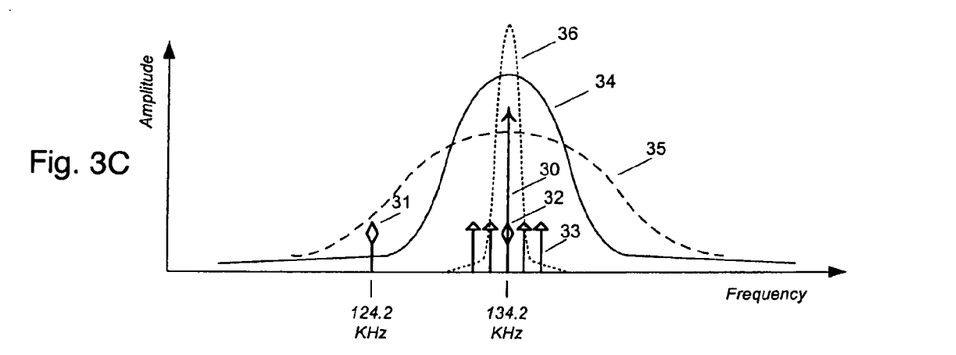
FIG. 3C illustrates the signal spectra of FIGS. 3A and 3B with respect to the frequency response of three possible reader resonant antennas.

The frequency spectral characteristics from FIG. 3A and FIG. 3B are shown together in FIG. 3C, along with curve [34], which is representative of the frequency response that typifies the reader's resonant antenna circuit. Optimizing the design of the resonant antenna circuit so that it performs well for both transmit and receive functions, and for both HDX and FDX-B, involves a series of design compromises. As a consequence, the resulting resonant antenna functions adequately as both transmitter and receiver for HDX and FDX-B, but it is not, and cannot be, simultaneously optimized for all four purposes. Thus, design improvements that counter the design compromises and that allow the resonant antenna to function more optimally are needed, and one such improvement is the subject matter of the present invention.

In order to be an efficient transmitter for radiating the 134.2 kHz activation signal, the resonant antenna circuit is ideally characterized by a very high quality factor, or "high-Q", as it is known to those skilled in the art. The "Q-factor" of an inductor used in a resonant circuit (such as the antenna is) describes "sharpness" or "selectivity" of the inductor. Mathematically, an inductor's Q is calculated according to the formula:

$$Q = \frac{2\pi f L}{R} = \frac{(L/C)^{1/2}}{R}$$

Where f is the resonant frequency, L is the inductor's inductance value, C is the resonant capacitance, and R is the inductor's resistance. Furthermore, the bandwidth of a resonant antenna circuit using such an inductor is:

$$BW=f/Q$$

Thus, a resonant antenna circuit has a very high-Q when its resistance is very low, and this very high-Q implies a very narrow bandwidth. As shown in FIG. 3C, a resonant antenna circuit with a very high-Q would exhibit a narrow bandwidth as depicted by the curve [36]. A very high-Q resonant antenna circuit would consequently be very effective and efficient for transmitting the single frequency activation signal, but would have insufficient bandwidth to capture the frequencies contained in the HDX and FDX-B transponder spectra. Thus, a very high-Q antenna will not work satisfactorily as both a transmitter and a receiver antenna.

Conversely, the resonant antenna circuit could be designed with a much lower Q-factor, perhaps exhibiting the bandwidth depicted by curve [35] in FIG. 3C. While this "low-Q" wide bandwidth characteristic would adequately capture all the transponder frequencies, it would not transmit the activation signal efficiently, and the wider bandwidth would make it more susceptible to interference signals from other nearby electromagnetic radiating sources.

A compromise resonant antenna circuit design that would function adequately as both a transmitter and a receiver, and for both HDX and FDX-B type tags, is shown by curve [34] in FIG. 3C. This resonant antenna design exhibits a Q-factor that is sufficiently high to allow efficient activation signal radiation, and rejection of interfering signals, but that is sufficiently low in order to ensure the reception of desired transponder signals.

From the curves [34], [35], and [36] in FIG. 3C, it is apparent that as the resonant antenna's Q-factor is increased to improve transmit efficiency and interference rejection, the first transponder signal frequency to be adversely affected is the HDX transponder's signal at 124.2 kHz [31]. That is, as curve [35] approaches the shape of curve [34], HDX transponder frequency [31] becomes weaker due to the resonant antenna circuit's decreasing sensitivity at 124.2 kHz [31]. However, if a means existed whereby the resonant antenna's characteristics could be dynamically altered, the Q-factor could be higher than would be otherwise possible, and the antenna could function more efficiently as transmitter and receiver for HDX and FDX-B type tags.

Figure 3D:
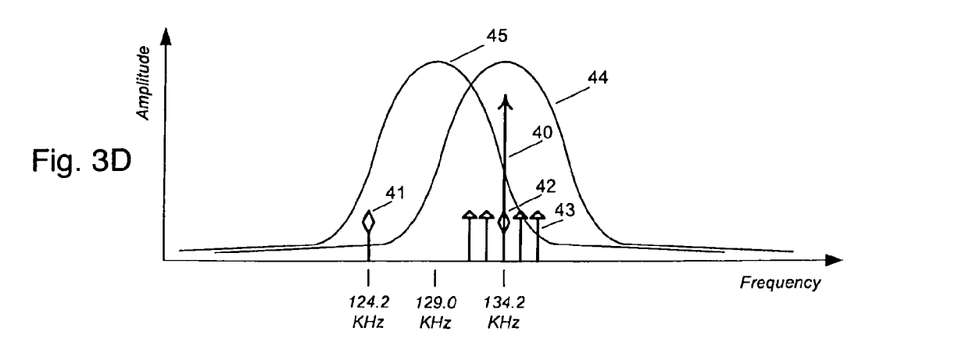
FIG. 3D illustrates the effect of dynamically tuning the resonant antenna circuit using the methods of the present invention.

FIG. 3D shows the same resonant antenna response curve of FIG. 3C, as curve [44]. A means is employed to dynamically shift the resonant antenna's tuning point from 134.2 kHz to a lower frequency—theoretically, about midpoint between 124.2 kHz and 134.2 kHz (i.e., about 129 kHz) as shown by curve [45]—during the HDX receive period. Thus, the resonant antenna circuit can have a higher Q-factor and greater interference rejection during the activation signal transmission and FDX-B tag signal reception interval, and yet capture both HDX signal frequencies at 124.2 kHz [41] and 134.2 kHz [42] during the HDX signal reception interval. The present invention discloses an efficient, economical, and reliable means that accomplishes this dynamic tuning of the resonant antenna circuit.

The reader of the present invention is capable of reading both HDX and FDX-B type transponders. The reader transmits an activation signal, comprising a 134.2 kilohertz (kHz) sinusoid, which is switched ON and OFF in a prescribed pattern in accordance with ISO 11785. During the interval in which the 134.2 kHz signal is ON, the FDX-B transponder is activated and it transmits its identification code signal cyclically for as long as the activation signal is present. During this ON interval also, an HDX transponder charges its internal capacitor. During the interval in which the 134.2 kHz activation signal is OFF, the FDX-B transponder is dormant, and the HDX transponder transmits its identification code sequence a single time.

Figure 2A:
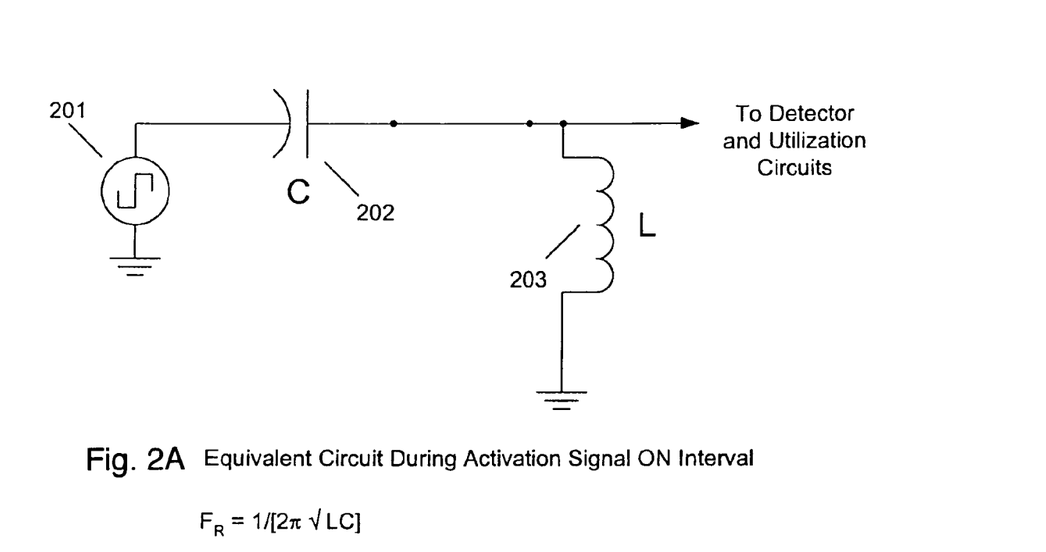
FIGS. 2A and 2B illustrate the electrical equivalent circuits for the prior art circuits of FIGS. 1B and 1C, respectively, for the activation signal ON (transmit) and activation signal OFF (HDX receive) intervals.

FIG. 2A illustrates a simplified electrical equivalent of the resonant antenna circuits of FIG. 1B and FIG. 1C during the activation signal ON interval. The signal source [201] produces a 134.2 single frequency signal, and drives an electrical current through the series resonant circuit comprising capacitor C [202] and antenna inductor L [203]. As calculated by the formula, $F_R=1/[2\pi\sqrt{LC}]$, resonance occurs at a frequency determined by the inverse of twice π times the square root of the product of the component values for C and L. For example, an inductor value of 281 microhenries (μH) and 5 nanofarads (nF) results in resonance at approximately 134.2 kHz.

It is important to note that the circuit shown in FIG. 2A contains reactive components C [202] and L [203], and consequently, the alternating current (AC) voltage that occurs at the junction of the inductor and capacitor (as measured with respect to ground) is typically several hundreds of volts, which is a result of application of the time-varying signal source [101]. This high voltage occurs when the activation signal is ON, and is absent when the activation signal is OFF.

Figure 2B:
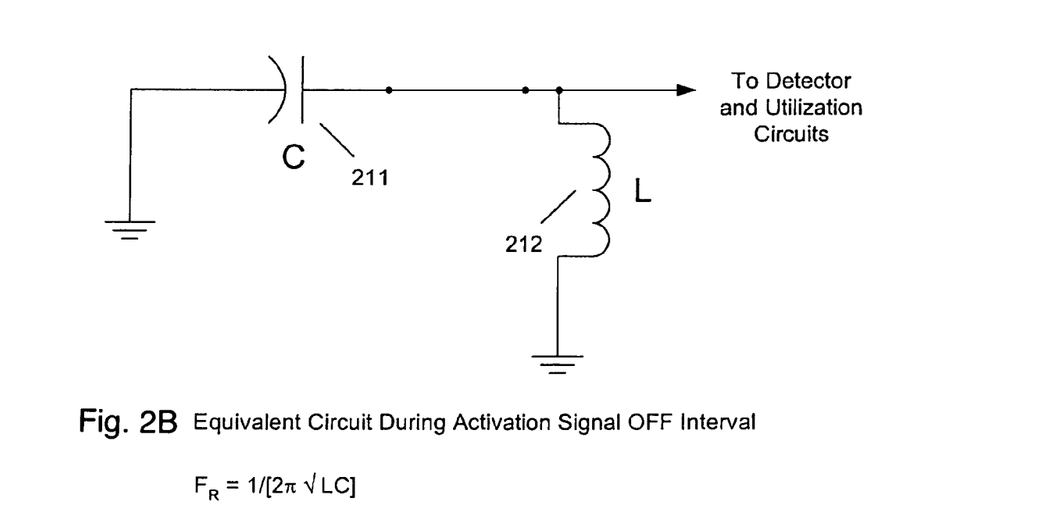

FIG. 2B illustrates the simplified electrical equivalent of the resonant antenna circuit during the activation signal OFF interval. The signal source is replaced by a low impedance connection to ground, such that the capacitor C [211] and inductor L [212] form a parallel tuned circuit, whose resonant frequency is the same as before (that is, $F_R=1/[2\pi\sqrt{LC}]$). In the circuits shown in FIGS. 2A and 2B, there is also present the previously mentioned resistance component, which is a consequence of the inductor being non-ideal. However, for the purposes of the present invention, the resistance component has secondary effects, and it is ignored for the sake of simplifying the explanation of the invention.

In order to alter the resonant frequency of the tuned circuits shown in FIG. 2A and FIG. 2B, the values of either the inductor or the capacitor (or both) need to be changed. In fact, many existing commercialized RFID readers use capacitor arrays wherein capacitors are added or removed from parallel connection with the capacitor C [202], [211] in order to tune the resonant antenna circuit to optimum resonance at 134.2 kHz. Other reader implementations exist in which a series wired variable inductor is adjusted by means of a ferrite slug, or in which the antenna inductance is similarly adjusted, in order to alter the circuit resonance. In both of these types of arrangements, tuning is not dynamic, but rather tuning is an alignment process that is set once and remains fixed during reader operation. Other reader implementations have used an adaptive tuning method wherein capacitor or inductor elements are automatically switched in or out of the resonant antenna circuit in order to maintain optimum resonance at the activation signal frequency. But, there are no known instances of dynamic tuning wherein the resonant antenna circuit tuning is altered between activation signal ON and OFF periods.

Adaptive tuning methods as described above have traditionally used electromechanical or electronic switching devices, such as relays or power transistors. In such configurations, generally a current sensing element is used to automatically adjust the capacitor or inductor settings using a feedback control mechanism that is algorithmically controlled in order to maximize the current in the resonant antenna circuit. Typically, such implementations suffer from reliability and stability problems. Furthermore, electronic switching devices, such as transistors or silicon-controlled rectifiers, are difficult and expensive to use in this type of RFID activation circuit where voltages can exceed 1 kilovolt peak-to-peak.

Figure 4A:
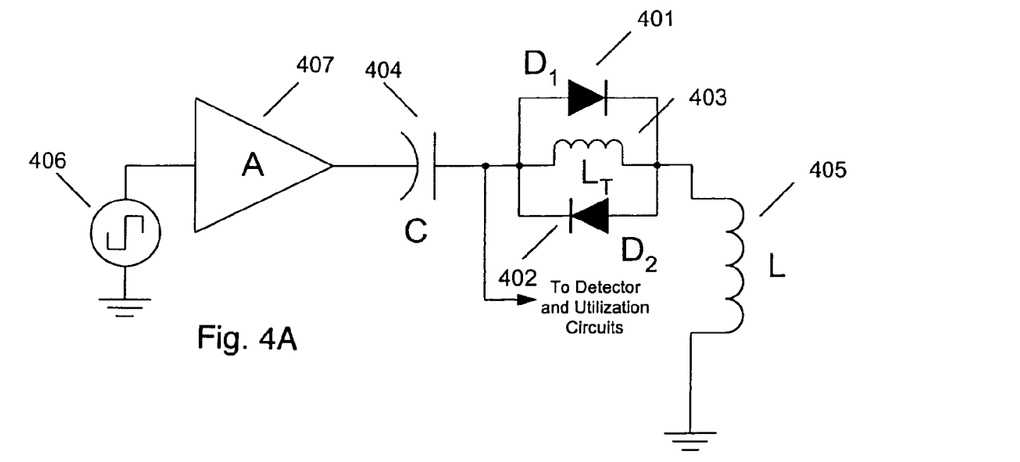
FIG. 4A illustrates an embodiment of the present invention with a single-ended antenna drive circuit.

Referring now to FIG. 4A, the present invention accomplishes the task of dynamic tuning using a network comprising three passive electronic components—two diodes $D_1$ [401] and $D_2$ [402], and one inductor, $L_T$ [403]. As is shown in FIG. 4A, these three components are mutually connected in parallel, with the diodes being wired with opposite polarities to one another. This network of components is inserted in series with the resonant antenna circuit's capacitor C [404] and antenna L [405] components.

When the activation signal [406] is ON, the two diodes, $D_1$ [401] and $D_2$ [402], become forward biased as a consequence of the alternating current (AC) high voltage level that is present, and together they bypass current around the inductor $L_T$ [403], thus shorting the inductor $L_T$ [403], and preventing its inductance value from affecting the resonance of the antenna circuit formed by capacitor C [404] and antenna inductor L [405]. For example, if the value of C [404] is 5 nF (i.e., $5\times10^{-9}$ farads) and the value of L [405] is 281 µH (i.e., $281\times10^{-6}$ henries), the resonant frequency is calculated from the formula:

$$F_R=1/[2\pi\sqrt{LC}]=134.27 \text{ kHz}$$

This is the optimum tuning point for the resonant antenna circuit during the activation signal ON period for both activation signal transmission and for reception of the FDX-B transponder signal, which is centered at 134.2 kHz.

Figure 5A:
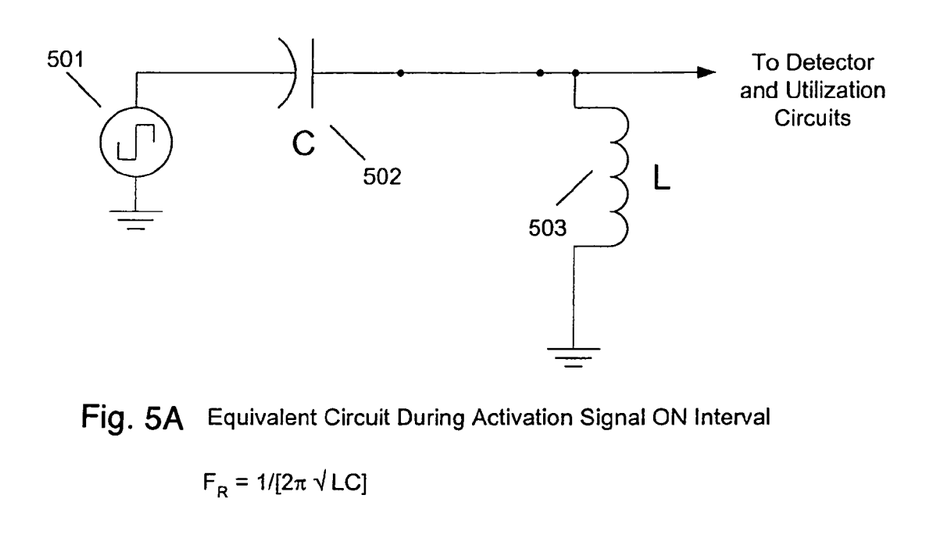
FIG. 5A illustrates an electrical equivalent circuit corresponding to FIG. 4A during the activation signal ON interval.

FIG. 5A shows the electrical equivalent circuit of FIG. 4A when the activation signal in ON. Referring to FIG. 4A, the diodes, $D_1$ [401] and $D_2$ [402], form a bi-directional bypass circuit around the inductor, $L_T$ [403], such that the inductor $L_T$ [403] is not present. Thus, referring to FIG. 5A, the resonant antenna circuit comprises only capacitor C [502] and antenna inductor L [503].

Referring again to FIG. 4A, when the activation signal is OFF, there is no voltage being applied to the resonant antenna circuit by the 134.2 kHz signal source [406]. The only voltage that does occur in the resonant antenna circuit is that which is induced by the HDX transponder, and this signal level is typically very small, typically in the range of microvolts to millivolts (i.e., $10^{-6}$ to $10^{-3}$ volts). Because this voltage level does not exceed the forward bias voltage of the diodes, $D_1$ [401] and $D_2$ [402], both diodes exhibit a very high impedance, and thus appear electrically as open circuits, allowing the inductor $L_T$ [403] to appear electrically in the resonant antenna circuit. (This forward bias voltage, or the "band-gap" voltage, as it is commonly called, is typically 0.4 volts for a Schottky type diode.)

Figure 5B:
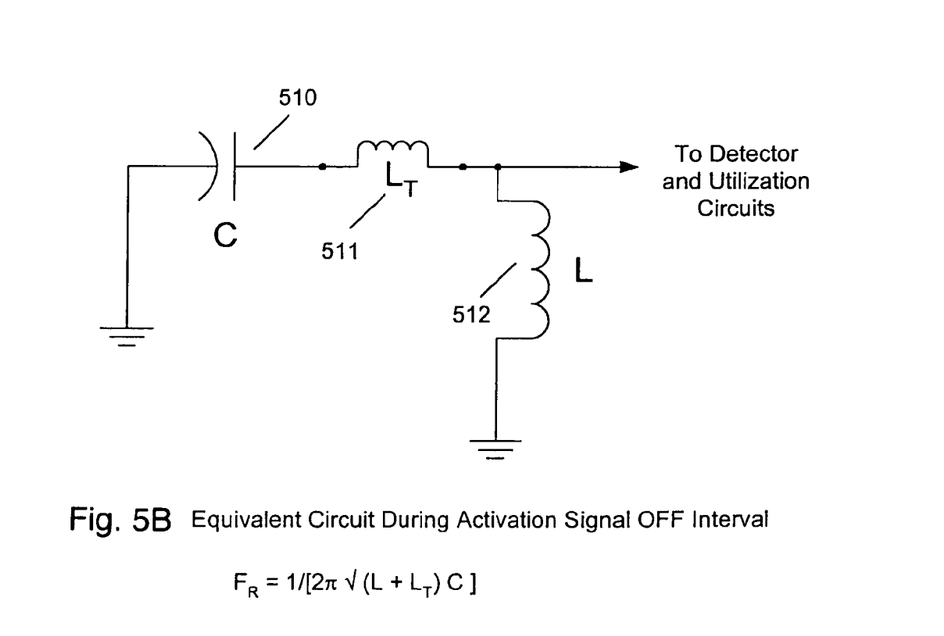
FIG. 5B illustrates an electrical equivalent circuit corresponding to FIG. 4A during the activation signal OFF interval.

FIG. 5B shows the electrical equivalent circuit of FIG. 4A when the activation signal is OFF. The inductor $L_T$ [511] appears electrically in the resonant antenna circuit, and the resonant antenna circuit's resonant frequency is altered to:

$$F_R=1/[2\pi\sqrt{(L+L_T)C}]$$

As was previously described in reference to curve [45] in FIG. 3D, the tuning of the circuit during the period when the activation signal is OFF and HDX signal reception is occurring needs to be about 129 kHz, in order to center the resonant antenna circuit between the two HDX transponder frequencies 124.2 kHz [41] and 134.2 kHz [42]. Consequently, the required value for $L_T$ [403] can be computed from the same equation for resonance. For example, with the same component values as before—281 µH and 5 nF—the new value for inductance needs to be:

$$L+L_T = 1/[4\pi^2 F_R^2 C] = 304 \,\mu\text{H}$$

Therefore, $$L_T=304\,\mu H-281\,\mu H=23\,\mu H$$

Thus, a three component network, comprising a mutually parallel wired 23 µH inductor and two back-to-back diodes, wired in series with the resonant antenna circuit's capacitive and inductive (antenna) components, will result in the antenna circuit resonating at 134.2 kHz when the activation signal is ON, and will result in the antenna circuit resonating at 129 kHz when the activation signal is OFF and the HDX transponder signal is being received. Consequently, the resonant antenna circuit is dynamically tuned in accordance with the state of the activation signal.

Referring again to FIG. 4A, suitable component choices for diodes $D_1$ [401] and $D_2$ [402], are high current low band-gap voltage Schottky diodes, such as part number IN5819 (manufactured by Diodes, Inc.), and inductor $L_T$ [403] is a power inductor, characterized by a very low DCR (direct current resistance), such as part number P1330-223K (manufactured by API Delevan). Other components are available that may exhibit more favorable characteristics with some readers, but generally the diodes $D_1$ [401] and $D_2$ [402], should have the lowest possible forward bias voltage, and the inductor $L_T$ [403] should have the lowest possible DCR. However, in some instances, inductors with a higher DCR as opposed to a lower DCR (and which tend to alter the Q-factor of the resonant antenna circuit as well as the resonant frequency) may exhibit more favorable performance because of the specific characteristics of the reader's antenna and receiver circuits.

Figure 6A:
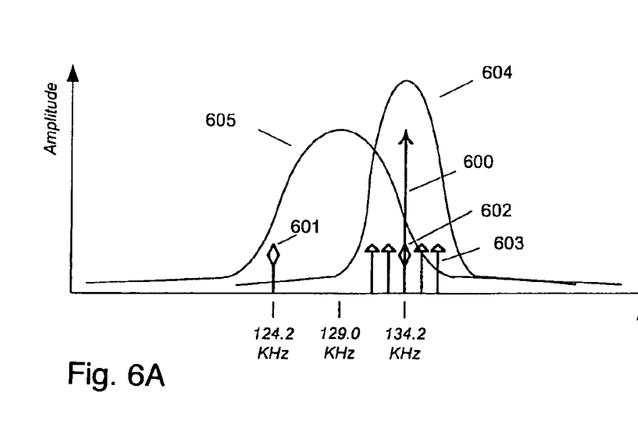
FIGS. 6A and 6B illustrate an alternative embodiment of the invention in which the dynamic tuning alters the resonant antenna circuit's resonant frequency and its Q-factor.
Figure 6B:
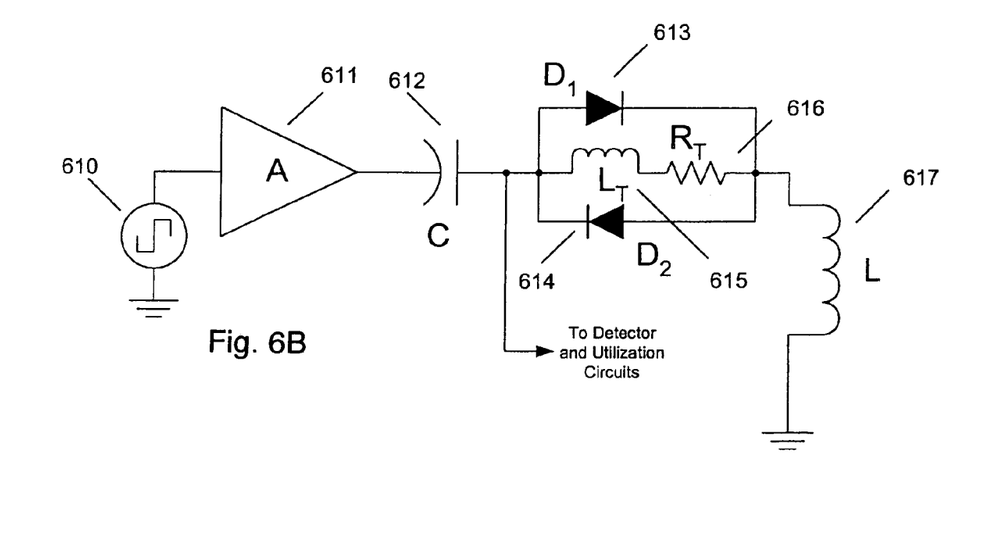

The capacitor C [404] and antenna inductor L [405] in FIG. 4A might be designed with a first particular Q-factor for resonance at 134.2 kHz. However, it is possible that a second lower Q-factor for the altered resonance frequency at 129.0 kHz might be optimum. In FIG. 6A, curve [604] shows a higher Q-factor for the 134.2 kHz tuning, and a lower Q-factor for tuning at 129.0 kHz. This lowering of the Q-factor broadens the bandwidth of the resonant antenna circuit, which might be advantageous. The Q-factor is easily lowered by means of the present invention simply by using an inductor $L_T$ [403] that has a particular characteristic DC resistance or by adding the required DC resistance value as a discrete resistor component in series with $L_T$ [403]. This configuration is illustrated in FIG. 6B, where inductor $L_T$ [615] is wired in series with resistor $R_T$ [616].

Figure 4B:
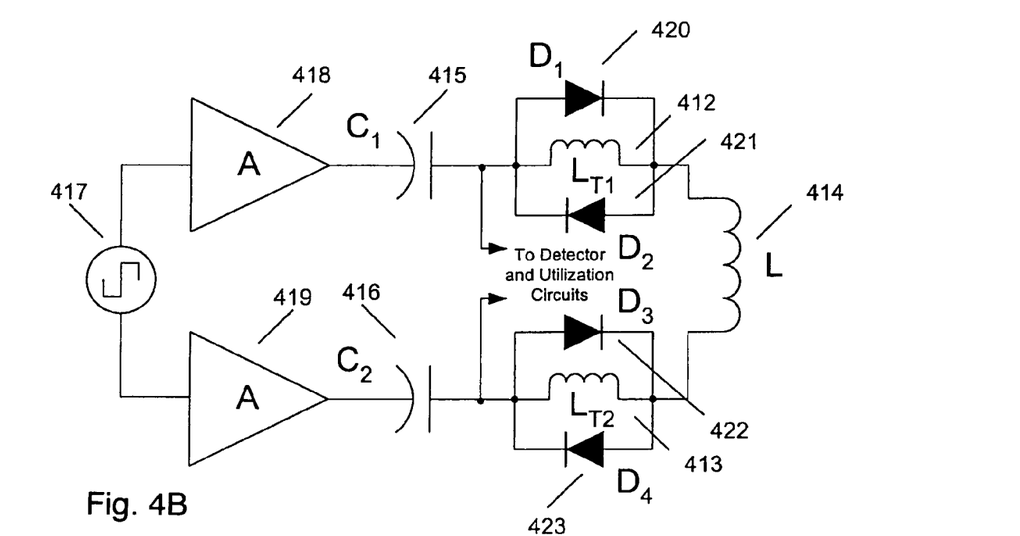
FIG. 4B illustrates an embodiment of the present invention with a balanced differential antenna drive circuit.

In a similar fashion, this adaptive tuning technique can be implemented in a differentially driven balanced circuit arrangement, as shown in FIG. 4B. Here, each capacitor $C_1$ [415] and $C_2$ [416] has twice the value as the capacitor in the single-ended configuration (that is, 10 nF), and the inductor L [414] would have the same value as before, being 281 µH. Inductor components $L_{T1}$ [412] and $L_{T2}$ [413] would have one-half the value calculated above, or approximately 11.5 µH.

Figure 4C:
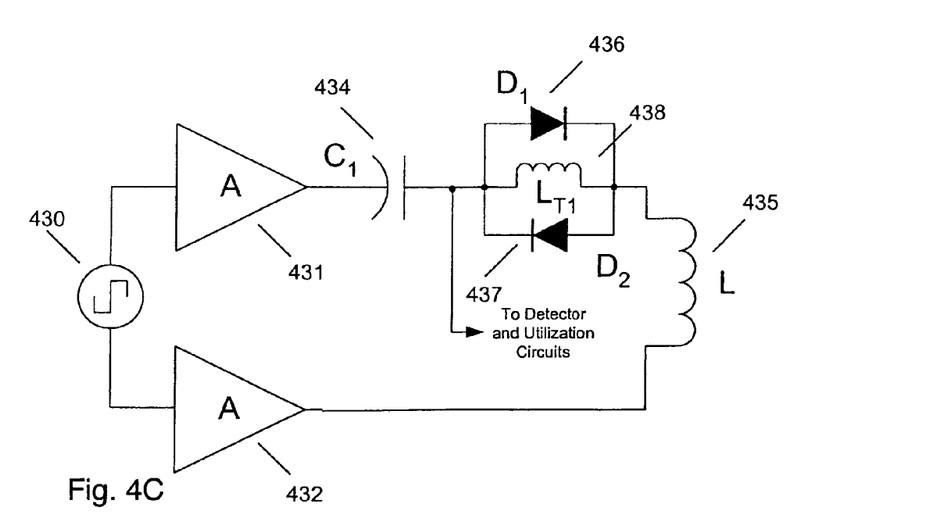
FIG. 4C illustrates an embodiment of the present invention with an unbalanced differential antenna drive circuit.
Figure 4D:
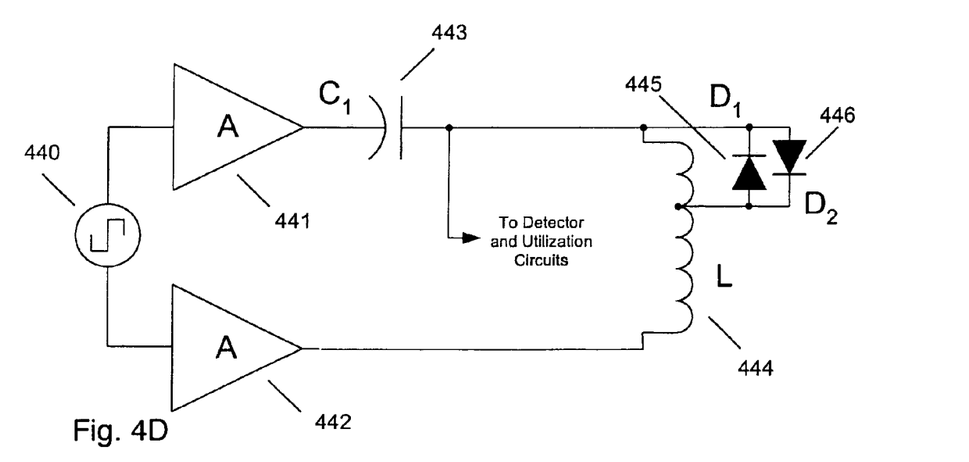
FIG. 4D illustrates an embodiment of the present invention with an unbalanced differential antenna drive circuit in which the dynamic tuning mechanism is integral to the antenna coil.

This adaptive tuning technique can be implemented in the differentially driven unbalanced circuit arrangement, as shown in FIG. 4C, wherein all component values are identical to those applicable to the circuit of FIG. 4A. FIG. 4C could use the balanced capacitor arrangement, $C_1$ [415] and $C_2$ [416] shown in FIG. 4B, as an obvious circuit variant. It is also possible to integrate the inductor $L_T$ [403] of FIG. 4A into the antenna as shown in FIG. 4D. Here, the antenna inductor L [444] has additional windings that add the appropriate inductance, and diodes $D_1$ [445] and $D_2$ [446] are wired back-to-back in parallel between one of the antenna's end terminals and an intermediate winding tap. This technique could include a specific resistance value as described above in reference to FIGS. 6A and 6B, which could be a discrete resistive component, or which could be characteristic of the antenna windings. This integral embodiment will work equally as well as does the discrete inductor, but implementation may not be especially convenient in all instances of antennas.

While the present invention is intended primarily for use in readers that incorporate both types of RFID technologies disclosed in ISO 11785, the invention is also useful in readers equipped with only the HDX portion of ISO 11785. Also, the present invention is applicable to readers in which a single antenna coil performs both transmitting and receiving functions, as well as to readers having multiple antennas, at least one of which performs both transmitting and receiving functions.

It will be recognized that the above-described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A tunable resonant circuit for a radio frequency identification (RFID) reader, wherein the reader transmits an activation signal to a transponder, the tunable resonant circuit comprising:
   at least one resonant frequency-determining element;
   a dynamic tuning network in series with the resonant frequency-determining element for tuning the resonant circuit to a first resonant frequency value when the activation signal is on and to a second resonant frequency value when the activation signal is off.

2. The tunable resonant circuit of claim 1 wherein the dynamic tuning network is configured to adjust a value of at least one of a capacitive or inductive circuit element in response to the activation signal.

3. The tunable resonant circuit of claim 2 wherein the dynamic tuning network is configured to switch an inductive circuit element in and out of the resonant circuit in response to the activation signal.

4. The tunable resonant circuit of claim 3 further comprising at least two diodes coupled to the inductive element so as to bypass or not bypass the inductive circuit element in response to the activation signal.

5. The tunable resonant circuit of claim 1 wherein the first resonant frequency value is 134.2±2 kHz.

6. The antenna circuit of claim 1 wherein the second resonant frequency value is 129.0±2 kHz.

7. The tunable resonant circuit of claim 1 wherein the first resonant frequency value corresponds to a receiving frequency for a first type of transponder and the second resonant frequency value corresponds to a receiving frequency for a second type of transponder.

8. The tunable resonant circuit of claim 7 wherein the first type of transponder is a FDX-B transponder.

9. The tunable resonant circuit of claim 7 wherein the second type of transponder is a HDX transponder.

10. The tunable resonant circuit of claim 1 wherein the first resonant frequency value corresponds to a frequency of the activation signal and the second resonant frequency value corresponds to a receiving frequency for the transponder.

11. The tunable resonant circuit of claim 1 wherein the at least one resonant frequency-determining element is an antenna coil.

12. The tunable resonant circuit of claim 11 further comprising at least a second resonant frequency-determining element, said second resonant frequency-determining element being a capacitor.

13. A variable bandwidth antenna circuit for a radio frequency identification (RFID) reader, wherein the reader transmits an activation signal to a transponder, the antenna circuit comprising a dynamic bandwidth adjustment network for establishing a first bandwidth value when the activation signal is on and a second bandwidth value when the activation signal is off.

14. The variable bandwidth antenna circuit of claim 13 wherein the dynamic bandwidth adjustment network comprises a resistive circuit element.

15. The variable bandwidth antenna circuit of claim 14 wherein the dynamic bandwidth adjustment network is configured to switch the resistive circuit element in and out of the antenna circuit in response to the activation signal.

16. The variable bandwidth antenna circuit of claim 15 further comprising at least two diodes coupled to the resistive circuit element so as to bypass or not bypass the resistive circuit element in response to the activation signal.

17. The variable bandwidth antenna circuit of claim 15 further comprising an inductive circuit element in series with the resistive circuit element and wherein the dynamic bandwidth adjustment network is configured to switch both the resistive circuit element and the inductive circuit element in and out of the antenna circuit in response to the activation signal.

* * * * *